United States Patent [19]

Wokeck et al.

[11] Patent Number: 5,186,600
[45] Date of Patent: Feb. 16, 1993

[54] GARMENT STACKER APPARATUS

[75] Inventors: Arthur C. Wokeck, Mauldin; Theodore Opuszenski, Greenville, both of S.C.

[73] Assignee: Clinton Industries, Inc., Carlstadt, N.J.

[21] Appl. No.: 643,993

[22] Filed: Jan. 22, 1991

[51] Int. Cl.⁵ .............................................. B65G 57/06
[52] U.S. Cl. .............................. 414/793.4; 414/794.4; 198/592; 198/607
[58] Field of Search .................. 414/788.1, 793.5, 222, 414/794.4, 13, 792.7, 794.7, 793.4; 112/121.29, 288, 304; 271/69, 198; 198/592, 607, 725, 728

[56] References Cited

U.S. PATENT DOCUMENTS

| | | | |
|---|---|---|---|
| 2,230,139 | 1/1941 | Gustin | 198/728 |
| 2,286,250 | 6/1942 | Albertoli | 198/725 X |
| 2,378,144 | 6/1945 | Kittler | 198/728 X |
| 2,490,381 | 12/1949 | Shields | 198/592 |
| 2,660,432 | 11/1953 | Wilske et al. | 198/592 X |
| 3,019,886 | 2/1962 | Winkler et al. | 198/607 X |
| 3,212,414 | 10/1965 | Kuratle | 414/788.1 X |
| 3,251,486 | 5/1966 | Parks | 198/607 X |
| 3,300,028 | 1/1967 | Landrey et al. | 198/725 X |
| 4,225,034 | 9/1980 | Sarovich | 198/728 X |
| 4,941,562 | 7/1990 | Proepper et al. | 198/728 X |

Primary Examiner—David A. Bucci
Assistant Examiner—Scott L. Lowe
Attorney, Agent, or Firm—Darby & Darby

[57] ABSTRACT

A garment stacker, having a plurality of conveyor belt assemblies, is attached to a worktable. Each assembly has two conveyor belts with one end of each sharing a common axis. All of the conveyor belts are provided with a plurality of flexible cleats for engaging the garment. One of the belts in each assembly is movable between a position away from the worktable, and a position near the worktable, where the cleats will engage a garment deposited on the worktable and pull it toward the other belt. The other belt in each assembly is nearly vertical and is positioned adjacent to a parallel slide. The garment is fed by the first belt into the space between the slide and the cleats on the vertical belt, which engage the garment and move it up the slide. The garment is then discharged over the top of the slide and onto a door. When the door is opened, the garment is dropped onto other garments, while maintaining its orientation so as to form a stack of oriented garments.

14 Claims, 4 Drawing Sheets

GARMENT STACKER APPARATUS

BACKGROUND OF THE INVENTION

This invention relates to stacking devices for garments. Specifically, the invention provides a belt system for moving a garment from a sewing workstation and stacking the garments for the next phase of their manufacture.

While the mechanization of the garment industry is over a century old, several operations in garment fabrication are still performed by hand. For example, stacking pants after completion at a sewing workstation is still done by hand. Although this does not involve heavy lifting, manual stacking does require considerable effort, especially after a stack has risen to a height of two or more feet. Over an entire day of stacking, worker fatigue and muscle strain become evident. This can seriously affect overall productivity and contribute to worker absence and increased healthcare costs.

This manual stacking operation has been necessary as no appropriate machines exist that will stack the pants in the proper orientation, for example, with the zipper facing up. Highly sophisticated and expensive robots could probably perform the task, but in the garment industry, these robots are simply not feasible at this time.

SUMMARY OF THE INVENTION

The present invention is directed to providing an automatic, mechanical stacking device for garments that will stack articles upon completion at a workstation.

It is an object of the invention that the stacking device automatically adjust to various thicknesses of material.

It is a further object of the invention that the garments be stacked in the proper orientation for the next production phase.

It is a further object of the invention that the stacking device be useful when an operator is sitting or standing.

It is a further object of the invention that the stacking device be selectably movable to a position that will not interfere with the sewing operation of the workstation.

It is a further object of the invention that the stacking device be easily manufactured and provide significant economic and ergonomic benefits for the garment industry.

In a preferred embodiment of the invention, a plurality of conveyor belt assemblies are attached to a worktable. Each assembly has two conveyor belts that share one common end axis. All of the conveyor belts are provided with a plurality of flexible cleats for engaging the garment. One of the belts in each assembly is movable between a position away from the worktable, and a position near the worktable, where the cleats can engage the garment and pull it toward the other belt. The other belt in each assembly is nearly vertical and is positioned adjacent to a parallel slide.

In operation, the garment is fed by the first belt into the space between the slide and the cleats on the vertical belt. These cleats engage the garment and move it up the slide. The garments are then discharged over the top of the slide so as to form a stack of garments with a common orientation.

BRIEF DESCRIPTION OF THE DRAWINGS

The foregoing and other objects and advantages of this invention will become apparent to those skilled in the art upon reading the detailed description of a preferred embodiment in conjunction with a review of the appended drawings, in which.

DETAILED DESCRIPTION OF THE INVENTION

Figure 1:
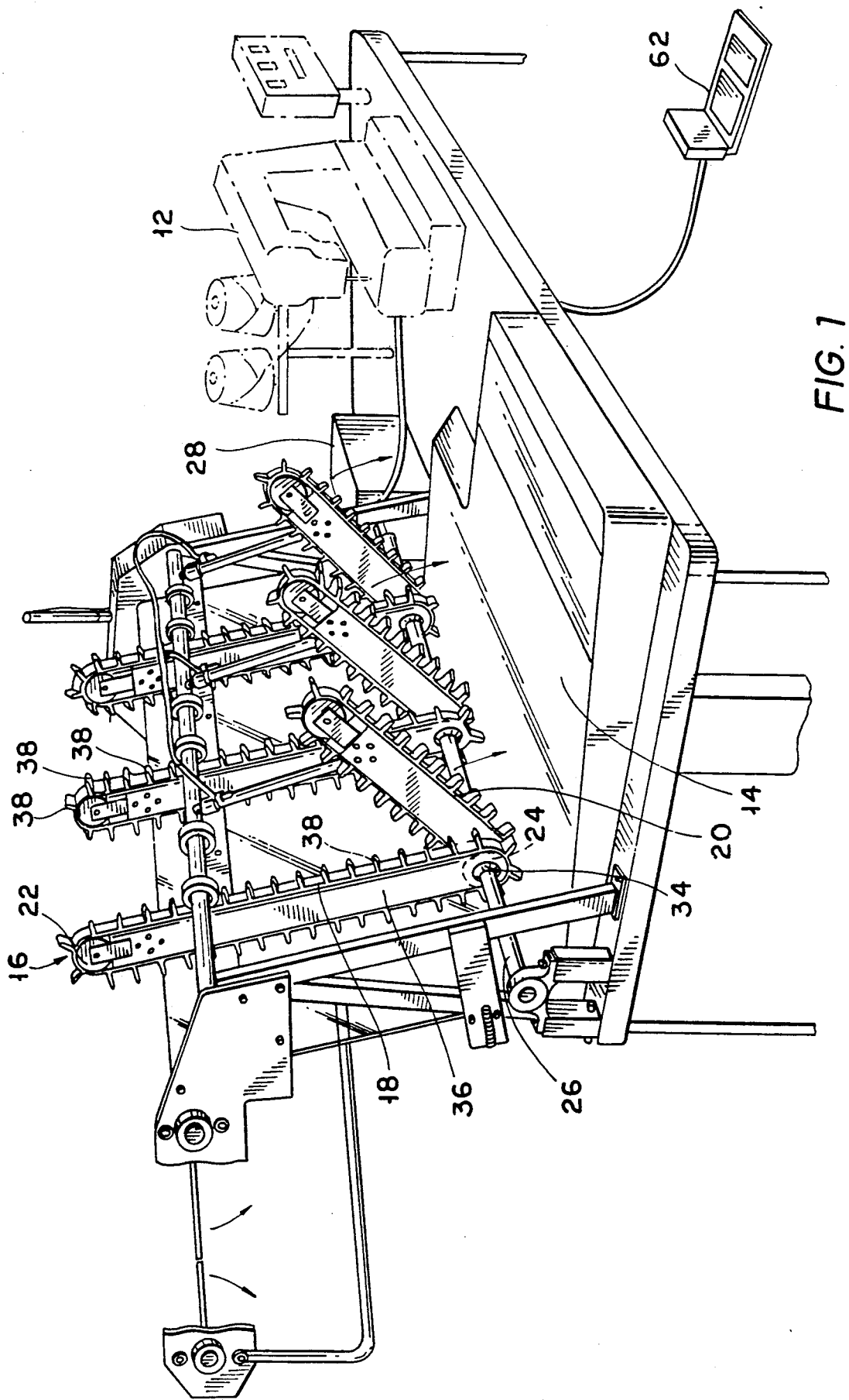
FIG. 1 is a perspective view of a pants stacker apparatus according to the present invention.

As shown in FIG. 1, the garment stacker of the present invention is preferably attached to a pants sewing workstation having a sewing machine 12 and a worktable 14. In the preferred embodiment, the stacker has three conveyor belt assemblies 16. Each assembly has a vertical conveyor belt 18 that forms a slightly obtuse angle with the worktable 14. Each assembly 16 also has a pivotable conveyor belt 20 positioned with one end near the bottom end of the vertical belt 18. All of the belts 18,20 are supported by rollers 22,24 which engage the interior of the belts 18,20. Each belt 18,20 travels on two rollers, a free-wheeling roller 22 and a power roller 24.

The power rollers 24 are connected to a shaft 26, which extends along the common axis of the power rollers 24. The shaft extends into a rotation mechanism 28, which is preferably a DC motor 30 with a gear box 32. The rotation mechanism 28 drives the shaft 26, which in turn drives the power rollers 24 so all the belts 18,20 move. The speed of the motor 30 can be adjusted to alter the rotation speed of the rollers 24 and the belts 18,20.

Also positioned on the shaft 26, although not rotating with it, are support bearings 34, one on each side of each power roller 24. Each support bearing 34 is attached to one end of a support plate 36. Each pair of support plates 36, i.e., two plates 36 on either side of a power roller 24, extend radially from the shaft 26 and rotatably suspend a roller 22 between their distal ends.

Figure 4:
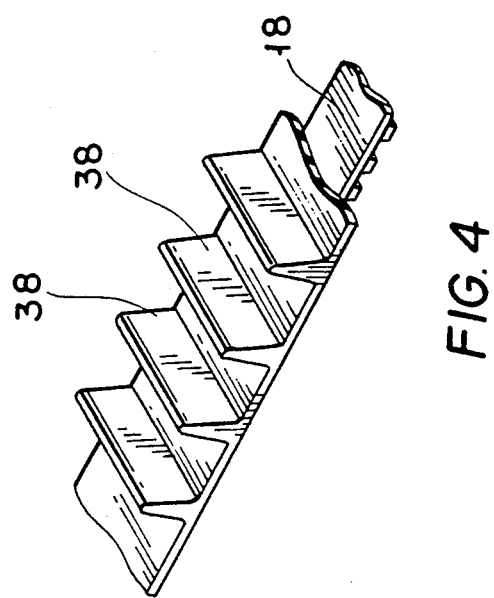
FIG. 4 is an enlarged perspective view of the cleats of a conveyor belt according to the invention.

Attached to each conveyor belt 18,20, over the entire outer surface, are a plurality of resilient projections 38 (FIG. 4), extending normal from the belts 18,20. The projections 38 can be any shape, but are preferably one inch-high tabs perpendicular to the direction of belt travel, and formed of a resilient material, such as foam plastic.

Figure 2:
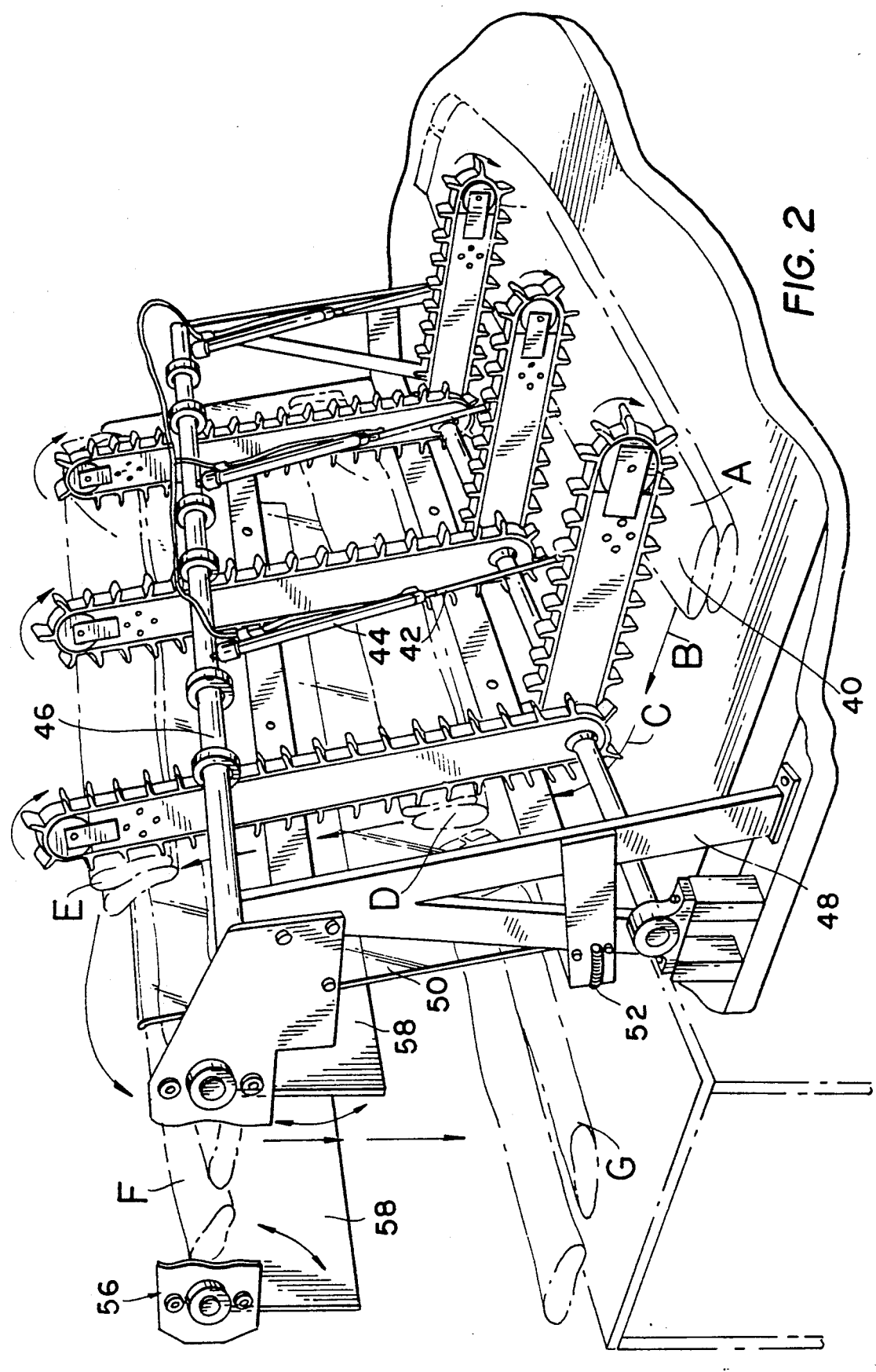
FIG. 2 is an enlarged perspective view according to FIG. 1 and showing the movement of pants through the apparatus.

After a garment, preferably a pair of pants 40, has been sewn by the sewing machine 12, the garment is inserted at the distal end A of the pivotable belts 20 between the roller 22 and the worktable 14 (FIG. 2). The conveyor belts 20 are lowered toward the worktable 14 so the pants 40 are slightly compressed between the projections 38 of belts 20 and the worktable 14, thus causing frictional engagement with the projections 38 and the pants. On the face of the pivotable belts 20 adjacent to the worktable 14, the projections 38 move toward the power roller 24 when the rotation mechanism 28 is energized. This drags the pants 40 toward the vertical belts 18 along the path of arrow B.

Attached to one of the support plates 36 supporting each of the pivotable conveyor belts 20 is a piston rod 42. Each piston rod 42 cooperates with a complementary cylinder 44, which is secured to a cross bar 46. The cross bar 46 comprises part of a frame assembly 48, which is mounted directly to the worktable 14. The cylinders 44 are preferably pneumatically-charged, and powered by an electronically controlled pneumatic source (not shown). By charging and discharging the cylinders 44, the piston rods 42 cause the support plates 36 to pivot about the shaft 26. The pivotable conveyor belts 20 are thus alternated between a position where the projections 38 are near the surface of the worktable 14 and a position where they are away from the worktable 14. Arrows 70 in FIG. 1 indicate rotation of pivotably belts 20. When the piston rods 42 are extended and the pivotable conveyor belts 20 are near the worktable 14, the pivotable belts 20 and the vertical belts 18 form a substantially right angle.

The worktable 14 is preferably fashioned with a gentle slope downward in a direction along the pivotable belts 20. This sloping worktable 14 terminates in the area C generally below the power rollers 24 and has a spring slide 50 attached near its edge and extending upward, parallel to the vertical conveyor belts 18. The spacing between the slide 50 and the distal end of the projections 38 on the vertical belts 18 is minimal, but the slide 50 incorporates two features that allow the pants 40 to move along the slide 50, while maintaining frictional engagement with the projections 38 of the vertical belts 18. The slide 50 is preferably made of a slightly resilient material and is also attached to the frame assembly 48 with springs 52. Both of these features allow the slide to move away from the vertical belts 18 if the pants 40 are thick. In addition, the resiliency of the projections 38 allows for a wide range of material thickness.

To assist in the transition from the worktable 14 to the slide 50, the slide 50 is provided with a curved bottom, either integrally molded or as an extra component. The slide 50 is preferably formed from a transparent, safety, scratch-resistant material so that the pants 40 can be viewed at all times for control purposes.

The pivotable conveyor belts 20 can also compensate for variations in the thickness of the pants 40. When the belts are lowered, pneumatic pressure in the cylinders 44 is released. The weight of the belts 20 provides sufficient downward pressure to grip the pants 40, but the belts 20 can still pivot up and down slightly, if necessary. The cleats 38 on belt 20 engage the pants and move them upwardly along the slide 50 to position D.

Figure 3:
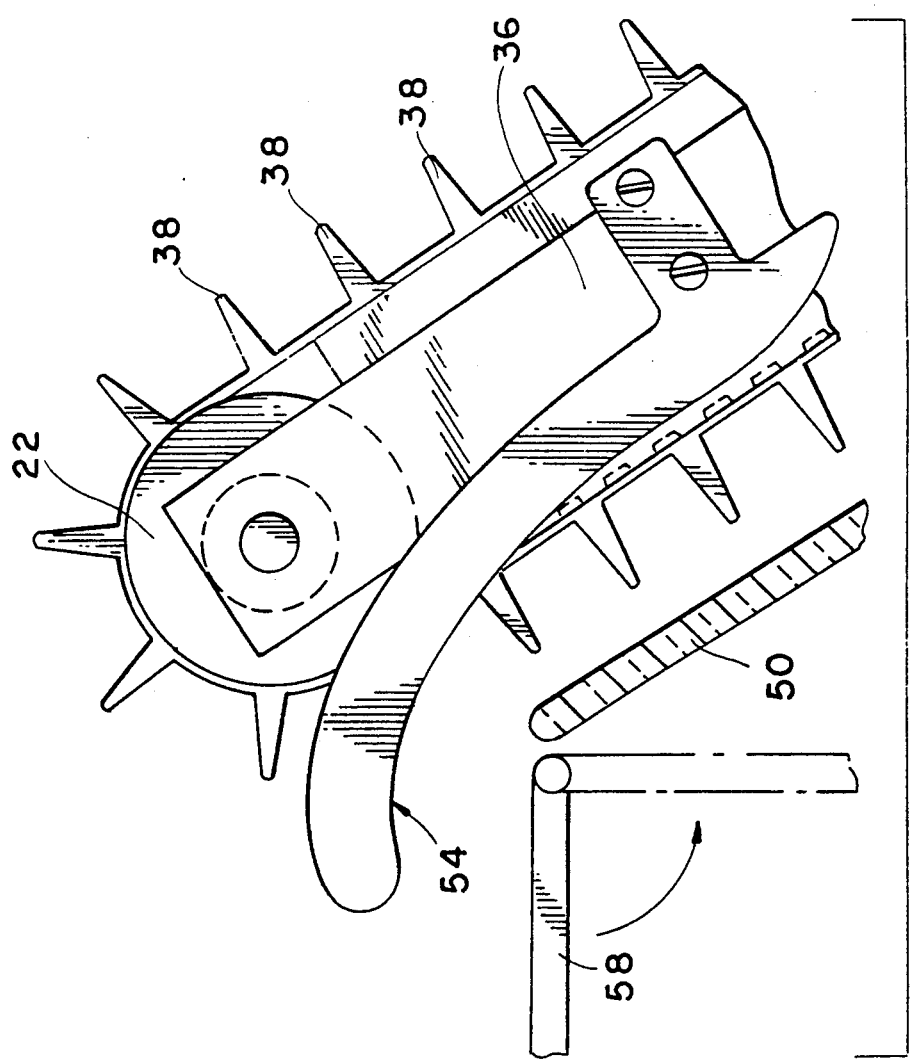
FIG. 3 is an even greater enlargement of the top of the slide mechanism of the apparatus of FIG. 1.
Figure 5:
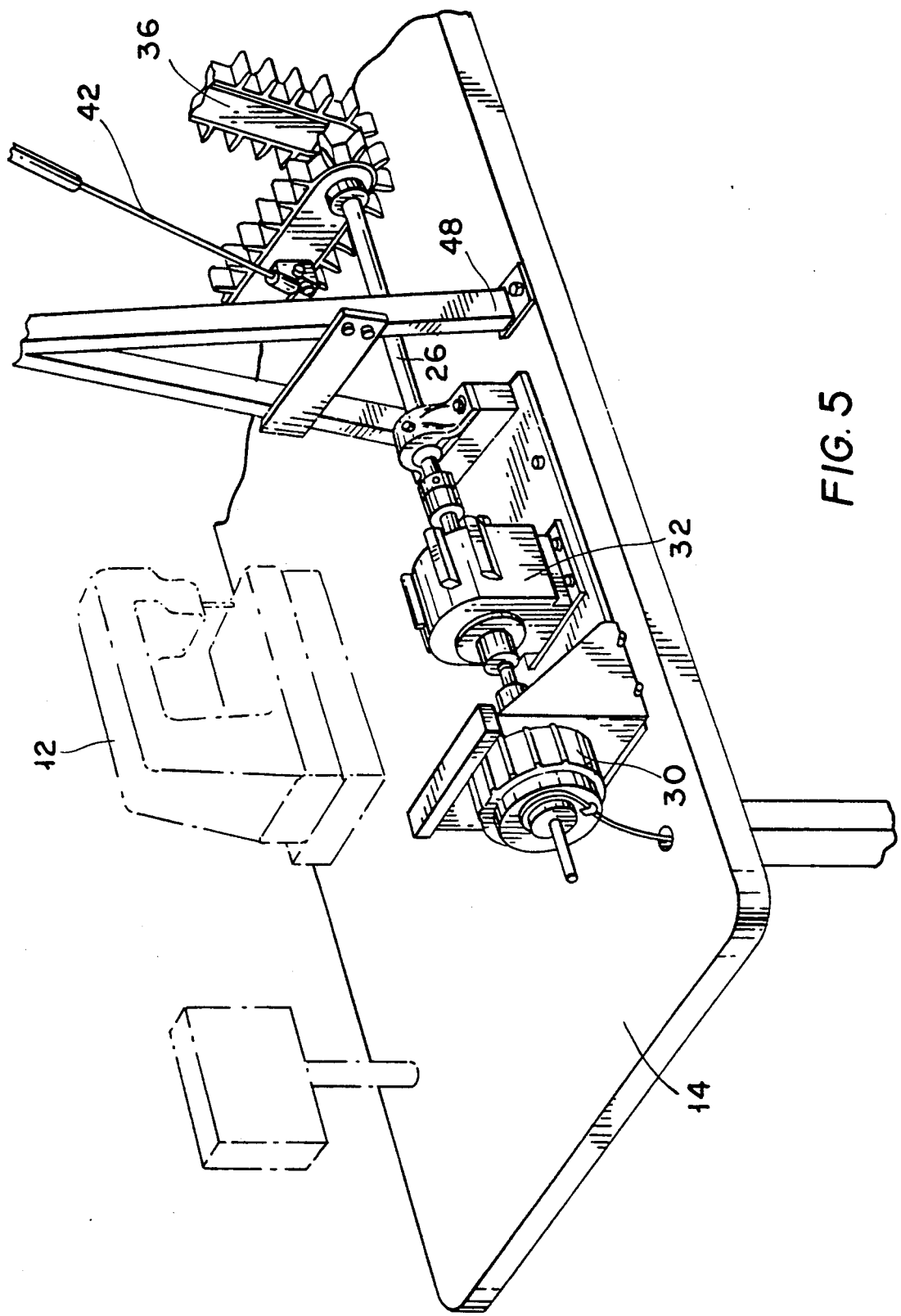
FIG. 5 is an enlarged perspective view of the rotation mechanism of the apparatus of FIG. 1.

To aid in discharging the garment at the top of the slide 50 (position F), a curved deflector 54, as shown in FIG. 3, is attached to the top of one of the two support plates 36 on each vertical conveyor belt 18. The deflector 54 prevents the pants 40 from traveling over the top of the vertical belts 18 and back to the worktable 14. The deflector 54 also keeps the pants 40 in the proper orientation as they leave the vertical belts 18.

After the pants 40 have traveled past the deflector 54, they are discharged onto a trap door assembly 56 (position F in FIG. 2). The assembly 56 is attached to the frame 48 and includes two trap doors 58 that open downward, allowing the pants 40 to drop down and form a stack of pants (position G). Trap doors 58 pivot on pivot shafts 74. Arrows 72 in FIGS. 1 and 2 indicate pivoting of trap doors 58. Some of the assembly 56 is preferably supported by a bar 76, which is attached to the remainder of the stacker. In FIGS. 2 and 3, the original position of the trap doors 58' is shown in dotted line form. The assembly 56 is designed to keep the pants 40 in proper orientation for stacking by having the deflector 54 positioned laterally to the doors 58. This causes the pants 40 to slide across the doors 58, rather than being dropped or rolled onto them, and thus maintains its orientation. The trap doors 58 are controlled by any known pneumatic system (not shown).

When the sewing machine 12 is in operation, a foot pedal 62 controls the selective connection of a pneumatic source to the cylinders 44, causing the pivotable belts 20 to pivot about the shaft 26 to form an acute angle with the vertical belts 18 (FIG. 1). This keeps any part of the stacker from interfering with the sewing operation until the pants 40 are finished at the sewing machine 12.

The length of the belts 18,20 and the support plates 36 and thus, the distance between the power rollers 24 and the rollers 22, can be adjusted during manufacture depending on the type of workstation and whether the operator sits or stands at the workstation.

In one embodiment of the invention, the proximal ends of the projections 38 form a covering for the conveyor belts 18,20, that is significantly wider than the belts 18,20. This covering serves as a protective shield at the juncture of the belts 18,20 and the rollers 22,24 to avoid having articles or the operator getting caught between them. The support plates 36 have substantially the same shape as the lateral cross section of the conveyor belts 18,20 to further protect the operator or articles from being caught in the rollers 22,24.

Since the rotation mechanism 32 and the pneumatic source connected to the cylinders 44 are electronically controlled, two disabling switches (not shown) can be incorporated into the stacker. The first switch is used as an emergency stop button, causing the entire stacker to stop. The second switch is used to stop or delay the stacker temporarily, while the operator examines the pants 40 as part of a normal inspection routine.

While the embodiment of the invention shown and described is fully capable of achieving the results desired, it is to be understood that this embodiment has been shown and described for purposes of illustration only and not for purposes of limitation. Other variations in the form and details that occur to those skilled in the art and which are within the spirit and scope of the invention are not specifically addressed. Therefore, the invention is limited only by the appended claims.

What is claimed is:

1. A device for stacking garments deposited on a worktable having a stationary planar worktable surface, comprising:
   a first conveyor belt assembly with first and second ends, said first conveyor belt assembly comprising at least one first conveyor belt and being positionable above and substantially parallel to said stationary planar worktable surface wherein garments at said second end may be engaged by said at least one first conveyor belt and moved across said stationary planar worktable surface to said first end;
   a second conveyor belt assembly with first and second ends, said second conveyor belt assembly comprising at least one second conveyor belt and extending generally away from said planar worktable surface and being positioned at an upwardly inclined angle to said at least one first conveyor belt, the first end of said second conveyor belt assembly being generally coaxial with said first end of said first conveyor belt assembly;

a slide positioned generally parallel to said at least one second conveyor belt, said slide being attached to said worktable adjacent the first end of said first conveyor belt assembly, said at least one second conveyor belt engaging garments at the second end of said first conveyor belt assembly and moving them along said slide to discharge the garments at the second end of said second conveyor belt assembly; and means for discharging said garments in a uniform orientation to form a stack, said means being at the second end of said second conveyor belt assembly for receiving successive garments delivered by said at least one second conveyor belt.

2. A device as in claim 1 wherein each of said first and second conveyor belts has a plurality of projections extending therefrom whereby frictional engagement with said garments is increased, each of said first and second conveyor belts being located about a corresponding pair of rollers located at first and second ends of a corresponding conveyor belt assembly, the device further comprising a rotation means for engaging and rotating the rollers at the first end of each conveyor belt assembly.

3. A device as in claim 2 wherein said projections are formed of a resilient material.

4. A device as in claim 2 wherein a proximal end of said projections is wider than said belts, said proximal end forming a protective cover for said belts.

5. A device as in claim 2 wherein said engaged first rollers are coaxial.

6. A device as in claim 5 wherein said rotation means includes a DC motor and a gear assembly.

7. A device as in claim 1 wherein said first conveyor belt assembly is pivotable between first and second positions, said first conveyor belt assembly being adjacent to said worktable when in said first position and spaced from said worktable when in said second position.

8. A device as in claim 7 wherein when said first conveyor belt assembly is in said first position, said first conveyor belt assembly forms a substantially right angle with said second conveyor belt assembly.

9. A device as in claim 7 wherein said first conveyor belt assembly further comprises pivoting means for moving said first conveyor belt assembly between said first and second positions, said pivoting means comprising at least one pneumatic piston.

10. A device as in claim 1 wherein said second conveyor belt assembly forms an obtuse angle with said worktable.

11. A device for stacking garments deposited on a worktable having a stationary planar worktable surface, comprising:

a first conveyor belt assembly with first and second ends, said first conveyor belt assembly comprising at least one first conveyor belt and being positionable above and substantially parallel to said stationary planar worktable surface wherein garments at said second end may be engaged by said at least one first conveyor belt and moved across said stationary planar worktable surface to said first end;

a second conveyor belt assembly with first and second ends, said second conveyor belt assembly comprising at least one second conveyor belt and extending generally away from said planar worktable surface and being positioned at an upwardly inclined angle to said at least one first conveyor belt, the first end of said second conveyor belt assembly being generally coaxial with said first end of said first conveyor belt assembly;

a slide positioned generally parallel to said at least one second conveyor belt, said slide being attached to said worktable adjacent the first end of said first conveyor belt assembly, said at least one second conveyor belt engaging garments at the second end of said first conveyor belt assembly and moving them along said slide to discharge the garments at the second end of said second conveyor belt assembly; and a discharge device at the second end of said second conveyor belt assembly for receiving successive garments delivered by said at least one second conveyor belt and discharging said garments in a uniform orientation to form a stack;

wherein said slide is formed of a resilient, translucent material.

12. A device for stacking garments deposited on a worktable having a stationary planar worktable surface, comprising:

a first conveyor belt assembly with first and second ends, said first conveyor belt assembly comprising at least one first conveyor belt and being positionable above and substantially parallel to said stationary planar worktable surface wherein garments at said second end may be engaged by said at least one first conveyor belt and moved across said stationary planar worktable surface to said first end;

a second conveyor belt assembly with first and second ends, said second conveyor belt assembly comprising at least one second conveyor belt and extending generally away from said planar worktable surface and being positioned at an upwardly inclined angle to said at least one first conveyor belt, the first end of said second conveyor belt assembly being generally coaxial with said first end of said first conveyor belt assembly;

a slide positioned generally parallel to said at least one second conveyor belt, said slide being attached to said worktable adjacent the first end of said first conveyor belt assembly, said at least one second conveyor belt engaging garments at the second end of said first conveyor belt assembly and moving them along said slide to discharge the garments at the second end of said second conveyor belt assembly; and a discharge device at the second end of said second conveyor belt assembly for receiving successive garments delivered by said at least one second conveyor belt and discharging said garments in a uniform orientation to form a stack;

wherein said slide is attached to said worktable by at least one spring whereby the distance between said slide and said projection will adjust to variations in the thickness of said garments by compression or expansion of said spring.

13. A device for stacking garments deposited on a worktable having a stationary planar worktable surface, comprising:

a first conveyor belt assembly with first and second ends, said first conveyor belt assembly comprising at least one first conveyor belt and being positionable above and substantially parallel to said stationary planar worktable surface wherein garments at said second end may be engaged by said at least one first conveyor belt and moved across said stationary planar worktable surface to said first end;

a second conveyor belt assembly with first and second ends, said second conveyor belt assembly comprising at least one second conveyor belt and extending generally away from said planar worktable surface and being positioned at an upwardly inclined angle to said at least one first conveyor belt, the first end of said second conveyor belt assembly being generally coaxial with said first end of said first conveyor belt assembly;

a slide positioned generally parallel to said at least one second conveyor belt, said slide being attached to said worktable adjacent the first end of said first conveyor belt assembly, said at least one second conveyor belt engaging garments at the second end of said first conveyor belt assembly and moving them along said slide to discharge the garments at the second end of said second conveyor belt assembly; and a discharge device at the second end of said second conveyor belt assembly for receiving successive garments delivered by said at least one second conveyor belt and discharging said garments in a uniform orientation to form a stack;

wherein said discharge device comprises a deflector positioned to one side of the second end of said second conveyor belt assembly, said slide terminating just before the second end of said second conveyor belt assembly, and said deflector is curved toward and above said slide, such that said garments are directed uniformly over and away from said slide.

14. A device for stacking garments deposited on a worktable having a stationary planar worktable surface, comprising:

a first conveyor belt assembly with first and second ends, said first conveyor belt assembly comprising at least one first conveyor belt and being positionable above and substantially parallel to said stationary planar worktable surface wherein garments at said second end may be engaged by said at least one first conveyor belt and moved across said stationary planar worktable surface to said first end;

a second conveyor belt assembly with first and second ends, said second conveyor belt assembly comprising at least one second conveyor belt and extending generally away from said planar worktable surface and being positioned at an upwardly inclined angle to said at least one first conveyor belt, the first end of said second conveyor belt assembly being generally coaxial with said first end of said first conveyor belt assembly;

a slide positioned generally parallel to said at least one second conveyor belt, said slide being attached to said worktable adjacent the first end of said first conveyor belt assembly, said at least one second conveyor belt engaging garments at the second end of said first conveyor belt assembly and moving them along said slide to discharge the garments at the second end of said second conveyor belt assembly;

a discharge device at the second end of said second conveyor belt assembly for receiving successive garments delivered by said at least one second conveyor belt and discharging said garments in a uniform orientation to form a stack; and a door means movable between opened and closed positions, said door means opening in the direction towards the worktable, said door means, when in the closed position, receiving garments laterally from said second conveyor belt assembly after contact with said discharge device, said door means allowing said garments to drop onto the stack without substantial rotation of said garment when moved into the open position.

* * * * *